United States Patent
Donley et al.

(10) Patent No.: US 6,897,675 B2
(45) Date of Patent: May 24, 2005

(54) SYSTEM AND METHOD FOR DEVICE SEQUENCING USING DISCRETE PLC CONTROL

(75) Inventors: Kevin A. Donley, Fishers, IN (US); Wesley O. Hamilton, Indianapolis, IN (US)

(73) Assignee: Electronic Data Systems Corporation, Plano, TX (US)

( * ) Notice: Subject to any disclaimer, the term of this patent is extended or adjusted under 35 U.S.C. 154(b) by 0 days.

(21) Appl. No.: 10/339,635

(22) Filed: Jan. 9, 2003

(65) Prior Publication Data

US 2004/0138767 A1 Jul. 15, 2004

(51) Int. Cl.⁷ .............................................. G06F 7/38
(52) U.S. Cl. ......................................... 326/38; 326/39
(58) Field of Search ............................ 326/38, 39, 41, 326/47, 49, 101; 700/17, 159

(56) References Cited

U.S. PATENT DOCUMENTS

| | | | |
|---|---|---|---|
| 5,383,117 A | | 1/1995 | Takai |
| 5,570,280 A | | 10/1996 | Nunnally et al. |
| 5,689,415 A | | 11/1997 | Calotychos et al. |
| 5,774,355 A | | 6/1998 | Mizuno et al. |
| 5,867,382 A | * | 2/1999 | McLaughlin ................. 700/17 |
| 6,154,684 A | * | 11/2000 | Schwenke et al. .......... 700/159 |
| 6,294,928 B1 | * | 9/2001 | Lytle et al. .................... 326/41 |
| 6,411,124 B2 | * | 6/2002 | Lee et al. ...................... 326/41 |
| 6,466,827 B1 | * | 10/2002 | Stine ............................ 700/18 |
| 6,583,720 B1 | * | 6/2003 | Quigley ...................... 340/521 |
| 2002/0198618 A1 | | 12/2002 | Madden et al. |

FOREIGN PATENT DOCUMENTS

| | | |
|---|---|---|
| EP | 0 487 117 A2 | 5/1992 |
| EP | 1 089 151 A2 | 4/2001 |

* cited by examiner

Primary Examiner—Michael Tokar
Assistant Examiner—Linh Van Nguyen
(74) Attorney, Agent, or Firm—Allen Scott Lineberry

(57) ABSTRACT

A system and apparatus for discrete PLC control using word sequences in a data table for controlling a device on an assembly line. The data table contains sequencing information which defines, for each station on the line, a series of operations with corresponding setup and operation parameters. By placing the sequencing information in a data table, programming or changing the series of operations for a PLC is made much more simple and efficient.

22 Claims, 3 Drawing Sheets

| | Data Table | Description | Decimal Value | Inputs — Positioning Switches (max 8) | | | | | | | | Socket Tray (max 4) | | | | Outputs | | | |
|---|---|---|---|---|---|---|---|---|---|---|---|---|---|---|---|---|---|---|---|
| | | | | 15 | 14 | 13 | 12 | 11 | 10 | 9 | 8 | 7 | 6 | 5 | 4 | 3 | 2 | 1 | 0 |
| Station A | Word 1 | Torque 1 | 0 | 0 | 0 | 0 | 0 | 0 | 0 | 0 | 0 | 0 | 0 | 0 | 0 | 0 | 0 | 0 | 0 |
| | Word 2 | Torque 2 | 0 | 0 | 0 | 0 | 0 | 0 | 0 | 0 | 0 | 0 | 0 | 0 | 0 | 0 | 0 | 0 | 0 |
| | Word 3 | Torque 3 | 0 | 0 | 0 | 0 | 0 | 0 | 0 | 0 | 0 | 0 | 0 | 0 | 0 | 0 | 0 | 0 | 0 |
| Station B | Word 4 | Torque 1 | 273 | 0 | 0 | 0 | 0 | 0 | 0 | 0 | 1 | 0 | 0 | 0 | 1 | 0 | 0 | 0 | 1 |
| | Word 5 | Torque 2 | 546 | 0 | 0 | 0 | 0 | 0 | 0 | 1 | 0 | 0 | 0 | 1 | 0 | 0 | 0 | 1 | 0 |
| | Word 6 | Torque 3 | 1058 | 0 | 0 | 0 | 0 | 0 | 1 | 0 | 0 | 0 | 0 | 1 | 0 | 0 | 0 | 1 | 0 |
| Station C | Word 7 | Torque 1 | 273 | 0 | 0 | 0 | 0 | 0 | 0 | 0 | 1 | 0 | 0 | 0 | 1 | 0 | 0 | 0 | 1 |
| | Word 8 | Torque 2 | 546 | 0 | 0 | 0 | 0 | 0 | 0 | 1 | 0 | 0 | 0 | 1 | 0 | 0 | 0 | 1 | 0 |
| | Word 9 | Torque 3 | 0 | 0 | 0 | 0 | 0 | 0 | 0 | 0 | 0 | 0 | 0 | 0 | 0 | 0 | 0 | 0 | 0 |

FIGURE 2

SYSTEM AND METHOD FOR DEVICE SEQUENCING USING DISCRETE PLC CONTROL

TECHNICAL FIELD OF THE INVENTION

The present invention is directed, in general, to automation processes and in particular to an improved system and method for device sequencing using programmable logic controllers.

BACKGROUND OF THE INVENTION

The Programmable Logic Controller (PLC) was invented in the 1960's for the automotive manufacturing industry. Since this time, virtually all successful manufacturing facilities now use them to automate the production line. PLCs are the hub of the manufacturing processes. These microprocessor-based units are used in processes as simple as conveyors to processes as complex as controlling and tracking sophisticated environment-critical manufacturing processes. They are used in virtually all new manufacturing, processing, assembly and monitoring equipment in one form or another.

The microprocessor or processor module is the "brain" of a PLC system. It consists of the microprocessor, memory integrated circuits, and circuits necessary to store and retrieve information from memory. It also includes communications ports to other peripherals, other PLC's or programming terminals. Today's processors vary widely in their capabilities to control real world devices. Some control as few as 6 inputs and outputs (I/O) and others 40,000 or more. One processor can control more than one process or manufacturing line. Processors are often linked together in order to provided continuity throughout the process.

The number of inputs and outputs PLCs can control are limited by the overall capacity of the PLC system hardware and memory capabilities. The inputs and outputs may be either discrete or analog signals. The job of the processor is to monitor status or state of input devices, scan and solve the logic of a user program, and set the appropriate state of the output devices.

For example, in an exemplary assembly line, electric torque guns are controlled by a torque controller that monitors and drives the gun to various parameters stored in the controller. Several parameter sets can be stored in the controller, and these are selected by a master control device such as a Programmable Logic Controller through discrete input signals.

One main PLC for an assembly line often communicates to several torque controllers on the line in an asynchronous manner. The number of torques and parameter sets vary for each station depending on the build process and work content. Initial plant start-up and new products introduced to the plant often cause changes in the torque sequence, number of torques, and parameter sets for the various stations. Additionally, as new products are introduced and old products phased out, entire torque stations can be added and/or removed from the production line.

All of these changes require modifications to the PLC logic that, in a conventional system, can be quite costly and often requires days or weeks to implement and validate. It would therefore be desirable to provide a system and method to allow greater flexibility in changing, adding, and/or removing PLC operation sequences in a timely manner.

SUMMARY OF THE INVENTION

To address the above-discussed deficiencies of the prior art, it is a primary object of the present invention to provide improved automation processes. It is another object of the present invention to provide an improved system and method for device sequencing using programmable logic controllers.

The preferred embodiment provides a system and method for discrete PLC control using word sequences in a data table for controlling a device on an assembly line. The data table contains sequencing information which defines, for each station on the line, a series of operations with corresponding setup and operation parameters. By placing the sequencing information in a data table, programming or changing the series of operations for a PLC is made much more simple and efficient.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which:

FIG. 2 depicts an exemplary data table in accordance with a preferred embodiment of the present invention.

DETAILED DESCRIPTION OF THE INVENTION

Figure 1:
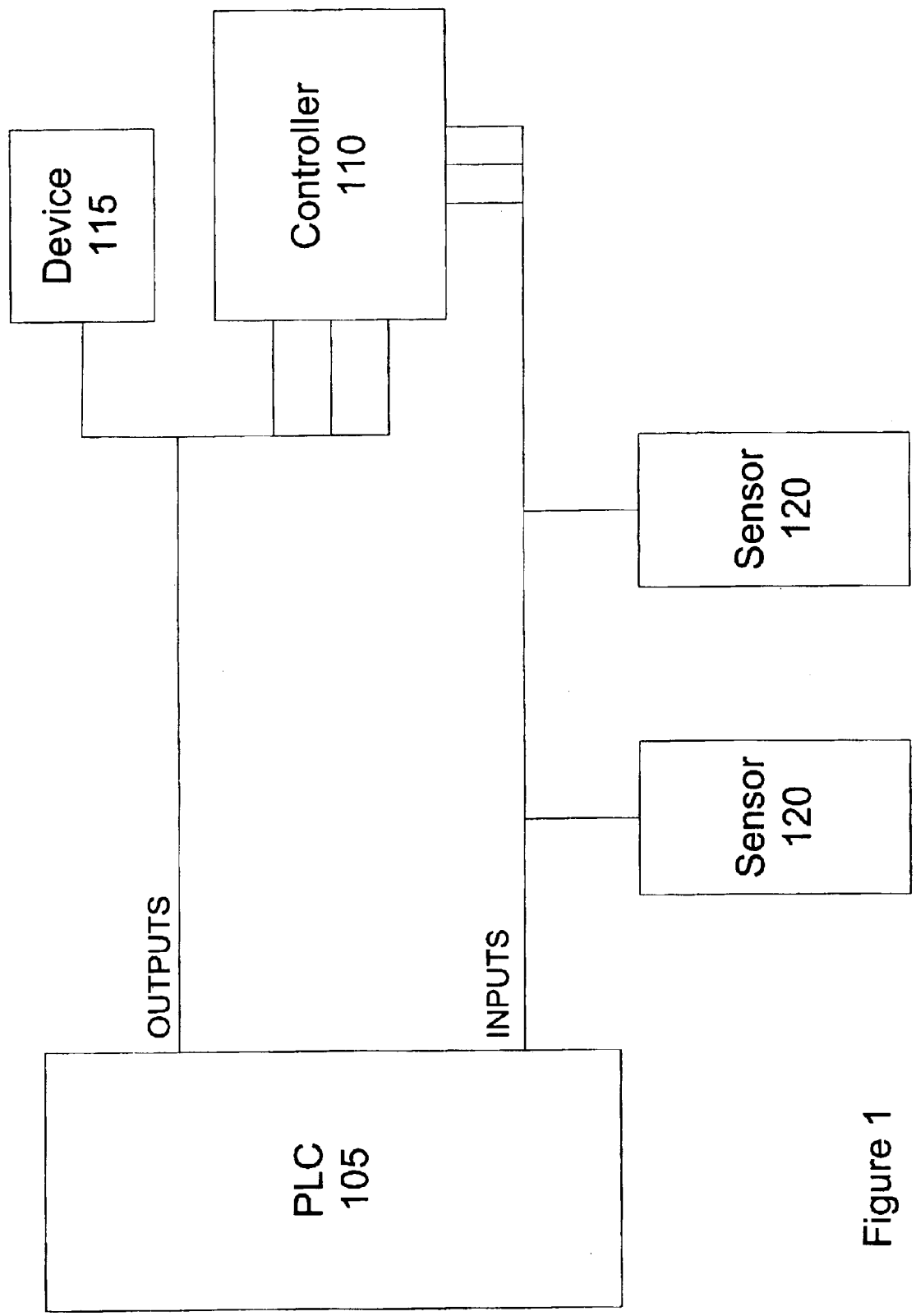
FIG. 1 depicts a block diagram of a system in accordance with a preferred embodiment of the present invention.
Figure 3:
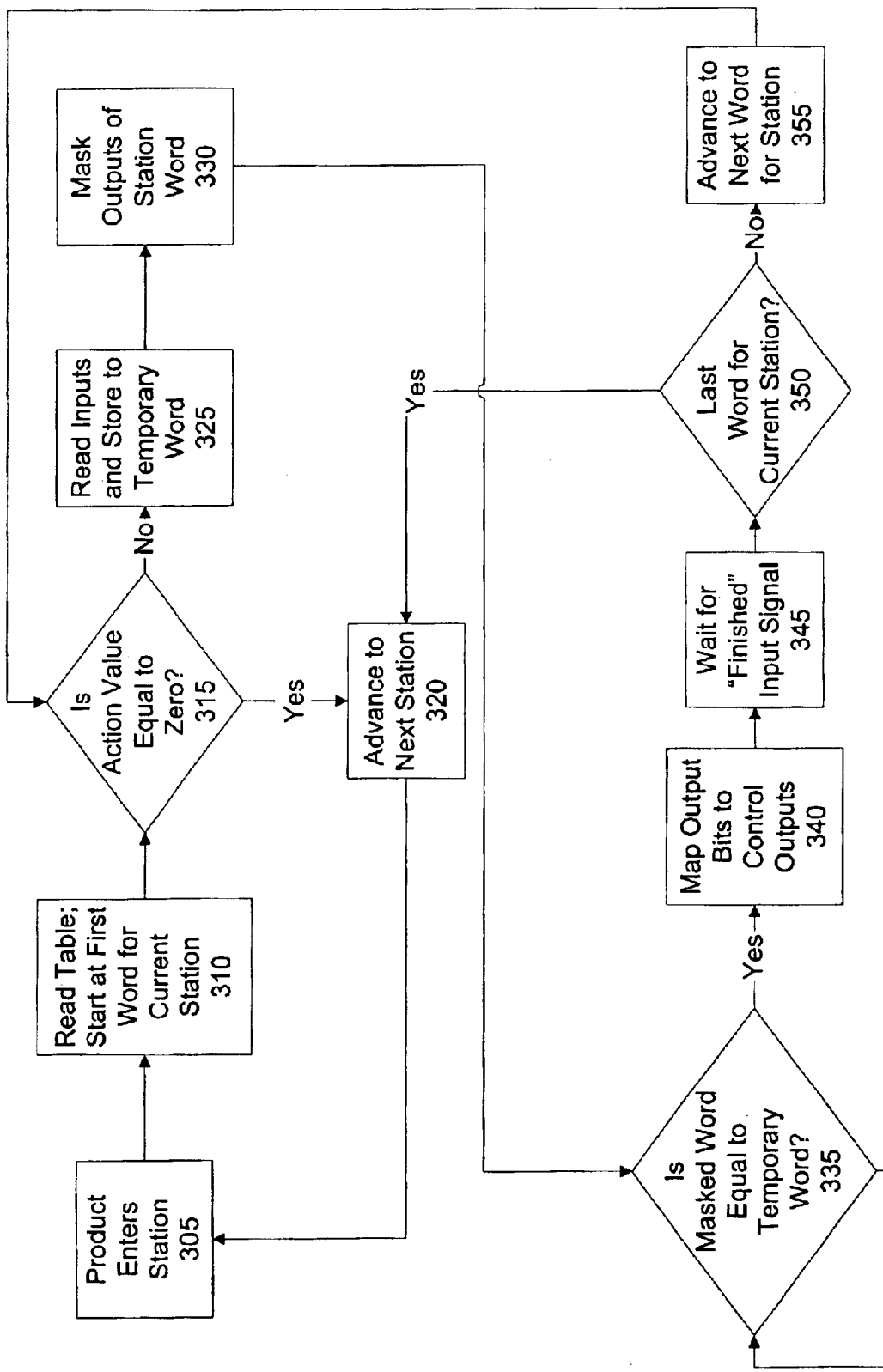
FIG. 3 depicts a flowchart of a process in accordance with a preferred embodiment of the present invention.

FIGS. 1 through 3, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device. The numerous innovative teachings of the present application will be described with particular reference to the presently preferred embodiment.

The preferred embodiment provides a system and method for discrete PLC control using word sequences in a data table for controlling a device on an assembly line. The data table contains sequencing information which defines, for each station on the line, a series of operations with corresponding setup and operation parameters. By placing the sequencing information in a data table, programming or changing the series of operations for a PLC is made much more simple and efficient.

A preferred embodiment, as shown in FIG. 1, requires at least one PLC 105 and at least one external device that communicates with the PLC through discrete input and output control. Each device can be a separate input or output, such as in the case of a sensor 120 or device 115, or it can have multiple dedicated inputs and outputs of its own, such as another controller 110. It should be noted that device 115 can be implemented by any suitable device, including but not limited to a torque gun or a valve.

The exemplary embodiment described herein relates to Atlas Copco Power Focus 3000 torque controllers being sequenced by an Allen-Bradley PLC-5/80E. However, the techniques and principles of this exemplary embodiment can easily be adapted to other devices (such as weld or motion controllers or other) that allow discrete control, within the abilities of one of skill in the art.

Additionally, the disclosed innovative techniques can work in other brands of PLCs that have indirect addressing capabilities, or in PLCs without indirect addressing with modifications within the abilities of one of skill in the art.

In contrast to conventional methods, which typically require a specific sequence "hard coded" in the PLC logic, the preferred embodiment uses generic sequencing logic that relies on data tables for the specific information. The data tables define the exact sequence and parameters needed by each torque controller.

When the logic is written for a production line, in an exemplary embodiment, it is assumed that every workstation on the line has or could have a torque gun (or other tool) present. A maximum number of torques allowed is determined and the data table is sized based on that maximum. These limitations are also based upon the memory constraints of the PLC.

For example, a 12-station line with a maximum of 10 torques per station would have a 120 word data table reserved for a particular product. Each station would look at its specific block of 10 words within the table to determine its torque sequence. Each word in the data table defines one or more conditions or actions for the controller, such as indicating which parameter the torque controller should select, which socket needs to be selected, and which position sensors need to be on to ensure the gun is in the correct location. The order that the words appear in the table is the order that the torque operations need to occur in the station.

A base set of generic sequencing logic is written in the PLC for every station on the line. Usually a separate ladder or "procedure" is used for each station. The only difference between the logic for each station is which set of words it looks at in the data table. When the product enters the workstation, the logic reads its first word in the data table and executes the torque accordingly. When a good torque is detected, the logic indexes to the next word in the table. This sequence continues until one of two conditions: the word in the data table equals zero (indicating the end of the sequence) or the maximum number of torques allowed for the station has been reached (in this case 10).

The flexibility of the preferred embodiment is that the logic is written once and never changes. If a station does not have a torque controller, the first word in the data table is zero. Therefore, the logic is not sequenced any further. If a torque controller is added to this station, non-zero values are placed in the data table which will cause the same set of logic to now execute torques at the station. Likewise, if an existing station is removed, its words are all set to zero and the logic will no longer sequence at that station. If the order of torques is changed at a station, it only requires reordering the numbers in the data table. If individual torques are added or removed from a station, their particular word is simply added or deleted from the data table.

When programming a PLC, the adding, removing, or reordering of numbers in its data table can be done in seconds. Rewriting the ladder logic, as is the conventional approach, may take days of programming and additional days of debug on the line. Since the PLC logic never changes (only the data table values), it should not have to be debugged after the first validation of the line. Only the torque sequence and product specifications have to be validated. This is extremely valuable to customers who are constantly trying to shorten the time from concept to market.

Finally, the preferred embodiment allows even further expansion by adding additional data tables for additional products. If a second or third product is added to the line, it only requires adding a second and third data table. Additional products can be added up to the limit initially imposed at the beginning of the project. This also allows the manufacturer to set up a data table for prototype or development products. This will allow them to use the production line to assemble prototype products during off hours or downtime without impacting their normal production. All of this leads to tremendous cost savings and a competitive advantage for the manufacturer.

The following is a simplified example of the algorithm. It uses a 3 station assembly line that allows a maximum of 3 torques per station. Additionally, there are position sensors that determine where the torque gun is located relative to the part to ensure the operator is torquing the correct bolt. Also, there is a socket tray that detects which socket is missing from the tray (and is assumed to be on the gun). The algorithm will not activate the torque gun until it is in the correct position and the correct socket has been selected. The correct status of these sensors is reflected in the data table. This example uses 16-bit words, as shown in the table of FIG. 2.

FIG. 2 shows an exemplary data table. In this table, each station A, B, & C has stored 3 respective control words. Each table element can contain a description field, and will preferably contain a set of control bits corresponding to inputs, outputs, or other parameters, and a decimal value corresponding to the BCD-coded control bits. In this table, the inputs correspond to a set of positioning switches and a set socket tray sensors, and the outputs correspond to a set of parameter selections.

This exemplary table is used in the exemplary process shown in the flowchart of FIG. 3.

When the product enters the first station (step 305), shown in the table as station A, its logic looks at the first action word for the station (step 310), shown as Word 1. The process checks the action value (step 315). Since the word value is zero, no torques will be done at this station and the process moves to the next station (step 320).

When the product enters station B (step 305), its logic looks at action Word 4 (step 310). The value is non-zero (step 315), so torques must be performed. The real-world sensors that detect position and sockets are mapped to a temporary word (step 325). The output bits of the action word (bits 0–3) are masked (step 330), and mapped to physical outputs. The remainder of the temporary word (bits 4–15) is compared to Word 4 (step 335). The process remains at this state until the words are equal.

When the words are equal, it indicates all of the sensors are in the correct state for this particular torque. At that point, bits 0–3 (the parameter set selection bits) are mapped to PLC outputs which are wired to the torque controller (step 340). This now selects the proper parameter set in the torque controller and the gun becomes enabled. When a good torque signal or other "finished" signal is received from the torque controller (step 345), the process determines if the current word is the last word for the station (step 350). If so, the process moves to the next station (step 320), and the process continues (step 305).

Since, in this example, there is another word for this station, the process advances to the next word for the station (step 355), in this case Word 5. Since Word 5 is non-zero, this process is repeated from checking the word value (step 315). The process continues for Word 6 and then stops since there is a maximum of three torques per station in this example.

When the product enters station C (step 305), its logic looks at Word 7 (step 310). The value is non-zero so the process continues in the same manner indicated above. However, this sequence will end after two torques since Word 9 is a zero value, indicating the end of the sequence for that station (step 320), and stopping since there are no more stations.

It should be noted that while this example used position sensors and socket trays, it is possible to use any number of real world devices. Any real world input or output can be mapped to or from the word in the data table regardless of the actual type of device.

Those skilled in the art will recognize that, for simplicity and clarity, the full structure and operation of all data processing systems suitable for use with the present invention is not being depicted or described herein. Instead, only so much of a control system as is unique to the present invention or necessary for an understanding of the present invention is depicted and described. The remainder of the construction and operation of the system may conform to any of the various current implementations and practices known in the art.

It is important to note that while the present invention has been described in the context of a fully functional system, those skilled in the art will appreciate that at least portions of the mechanism of the present invention are capable of being distributed in the form of instructions contained within a machine usable medium in any of a variety of forms, and that the present invention applies equally regardless of the particular type of instruction or signal bearing medium utilized to actually carry out the distribution. Examples of machine usable mediums include: nonvolatile, hard-coded type mediums such as read only memories (ROMs) or erasable, electrically programmable read only memories (EEPROMs), user-recordable type mediums such as floppy disks, hard disk drives and compact disk read only memories (CD-ROMs) or digital versatile disks (DVDs), and transmission type mediums such as digital and analog communication links.

Although an exemplary embodiment of the present invention has been described in detail, those skilled in the art will understand that various changes, substitutions, variations, and improvements of the invention disclosed herein may be made without departing from the spirit and scope of the invention in its broadest form.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC §112 unless the exact words "means for" are followed by a participle.

What is claimed is:

1. A method for operating a programmable-logic-controller controlled device, comprising:

providing a programmable logic controller having at least one input and at least one output;

providing a data table, stored in a computer-readable medium, readable by the programmable logic controller;

reading a first word from the data table;

performing an operation at a first station, controlled by the programmable logic controller, according to the contents of the first word.

2. The method of claim 1, further comprising evaluating the first word, and if the first word equals a predetermined value, then reading a second word from the data table.

3. The method of claim 1, further comprising reading a second word from the data table, and performing a second operation at the first station, according to the contents of the second word.

4. The method of claim 1, wherein the input is connected to a sensor.

5. The method of claim 1, further comprising comparing at least one bit of the first word to the input.

6. The method of claim 1, wherein the input is connected to determine the configuration of the device.

7. The method of claim 1, further comprising configuring the device so that the at least one bit of the first word equals the input.

8. The method of claim 1, wherein the output is connected to control the device.

9. The method of claim 1, wherein the data table contains multiple words, each word corresponding to a device operation and a device configuration.

10. The method of claim 1, wherein the operations of the programmable logic controller can be changed by changing the contents of the data table.

11. An apparatus, comprising:

a programmable logic controller having at least one input and at least one output;

a data table, stored in a computer-readable medium, readable by the programmable logic controller;

at least one device connected to be controlled by the programmable logic controller; and at least one word stored in the data table; wherein the word defines a device operation and corresponding operation parameters.

12. The apparatus of claim 11, further comprising a plurality of words stored in the data table, wherein each word defines a different device operation and corresponding operation parameters.

13. The apparatus of claim 11, wherein the device is an electric torque gun.

14. The apparatus of claim 11, further comprising at least one sensor connected to be read by the programmable logic controller.

15. The apparatus of claim 14, wherein the sensor indicates the present position of the device.

16. The apparatus of claim 14, wherein the sensor indicates the present configuration of the device.

17. The apparatus of claim 11, wherein if the word is equal to zero, then no operation is performed.

18. The apparatus of claim 11, further comprising configuring the device so that the at least one bit of the first word equals the input.

19. The apparatus of claim 11, wherein the data table contains multiple words, each word corresponding to a device operation and a device configuration.

20. The apparatus of claim 11, wherein the operations of the programmable logic controller can be changed by changing the contents of the data table.

21. The apparatus of claim 11, wherein the programmable logic controller controls multiple devices on multiple stations of an assembly line.

22. The apparatus of claim 11, wherein the contents of the data table can be changed without changing the programming of the programmable logic controller.

* * * * *